(12) United States Patent
Read

(10) Patent No.: US 7,643,503 B2
(45) Date of Patent: Jan. 5, 2010

(54) SYSTEM AND METHOD FOR DYNAMICALLY DETERMINING RETRANSMIT BUFFER TIME

(75) Inventor: Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 890 days.

(21) Appl. No.: 10/903,171

(22) Filed: Jul. 30, 2004

(65) Prior Publication Data

US 2006/0023673 A1    Feb. 2, 2006

(51) Int. Cl.
    *H04L 12/56* (2006.01)
(52) U.S. Cl. .............. 370/412; 370/519; 370/328; 714/748; 709/234; 455/418
(58) Field of Classification Search .......... 370/328, 370/394, 519, 466, 236, 474, 349, 252, 230, 370/412; 455/418; 709/237, 224, 234; 714/708, 714/748
See application file for complete search history.

(56) References Cited

U.S. PATENT DOCUMENTS

| 5,179,557 | A | | 1/1993 | Kudo ..................... 370/94.1 |
| 5,278,830 | A | | 1/1994 | Kudo ..................... 370/94.1 |
| 5,442,637 | A | * | 8/1995 | Nguyen ................... 714/708 |
| 5,592,483 | A | | 1/1997 | Hieda et al. .............. 370/85.3 |
| 5,751,335 | A | | 5/1998 | Shintani |
| 5,802,041 | A | | 9/1998 | Waclawsky et al. ........ 370/245 |
| 5,903,724 | A | | 5/1999 | Takamoto et al. ........ 395/200.3 |
| 6,021,124 | A | * | 2/2000 | Haartsen ................... 370/336 |
| 6,076,114 | A | | 6/2000 | Wesley .................... 709/235 |
| 6,266,480 | B1 | | 7/2001 | Ezaki et al. |
| 6,275,471 | B1 | | 8/2001 | Bushmitch et al. ......... 370/248 |
| 6,701,372 | B2 | | 3/2004 | Yano et al. ................ 709/232 |
| 6,757,255 | B1 | * | 6/2004 | Aoki et al. ................ 370/252 |
| 6,831,908 | B2 | | 12/2004 | Kikuchi |
| 7,146,417 | B1 | * | 12/2006 | Coile et al. ................ 709/224 |
| 7,164,680 | B2 | * | 1/2007 | Loguinov .................. 370/394 |
| 7,233,573 | B2 | * | 6/2007 | Walls et al. ............... 370/236 |
| 2001/0034788 | A1 | | 10/2001 | McTernan et al. ......... 709/232 |
| 2002/0114302 | A1 | | 8/2002 | McDonald et al. ........ 370/338 |
| 2002/0114304 | A1 | | 8/2002 | Hur et al. .................. 370/338 |
| 2002/0141370 | A1 | | 10/2002 | Abrol et al. ............... 370/338 |
| 2002/0154600 | A1 | * | 10/2002 | Ido et al. .................. 370/216 |

(Continued)

FOREIGN PATENT DOCUMENTS

EP    001263160 A1    12/2002

(Continued)

OTHER PUBLICATIONS

Christopher Jensen Read, Final Office Action dated May 20, 2009 from pending U.S. Appl. No. 11/079,497, filed Mar. 14, 2005 (1168-129.CIP).

*Primary Examiner*—Danh C Le
(74) *Attorney, Agent, or Firm*—John L. Rogitz

(57) ABSTRACT

A packetized data receiver establishes at the beginning of receiving each respective stream a buffer length for sending packets to higher levels of a protocol stack in the event that a packet is missed. This can be done by requesting retransmission of the first packet and measuring the actual time delay between request and receipt of the retransmitted packet.

12 Claims, 3 Drawing Sheets

U.S. PATENT DOCUMENTS

| | | | |
|---|---|---|---|
| 2002/0165973 A1* | 11/2002 | Ben-Yehezkel et al. | 709/230 |
| 2002/0181506 A1* | 12/2002 | Loguinov | 370/473 |
| 2002/0191594 A1* | 12/2002 | Itoh et al. | 370/352 |
| 2003/0007454 A1 | 1/2003 | Shorey | 370/229 |
| 2003/0037158 A1 | 2/2003 | Yano et al. | 709/232 |
| 2003/0046032 A1* | 3/2003 | Puthiyedath | 702/188 |
| 2003/0067872 A1 | 4/2003 | Harrell et al. | 370/229 |
| 2003/0086427 A1* | 5/2003 | Lee et al. | 370/394 |
| 2003/0120802 A1* | 6/2003 | Kohno | 709/237 |
| 2003/0145100 A1 | 7/2003 | Marchetto et al. | 709/233 |
| 2003/0191844 A1 | 10/2003 | Meyer et al. | 709/227 |
| 2004/0003107 A1* | 1/2004 | Barham et al. | 709/235 |
| 2004/0038645 A1 | 2/2004 | Rcunamaki et al. | 455/41.2 |
| 2004/0057459 A1* | 3/2004 | Sharony et al. | 370/468 |
| 2004/0078624 A1* | 4/2004 | Maxemchuk et al. | 714/4 |
| 2004/0114565 A1 | 6/2004 | Sipola | 370/349 |
| 2004/0019376 A1 | 9/2004 | Leon et al. | 710/52 |
| 2004/0174893 A1 | 9/2004 | Saito | 370/420 |
| 2004/0213287 A1* | 10/2004 | Komori et al. | 370/466 |
| 2005/0180323 A1* | 8/2005 | Beightol et al. | 370/230 |
| 2006/0023710 A1 | 2/2006 | Read | |
| 2006/0203760 A1* | 9/2006 | Fukui et al. | 370/328 |

FOREIGN PATENT DOCUMENTS

| | | |
|---|---|---|
| JP | 2000115233 A | 4/2000 |
| JP | 2000261496 A | 9/2000 |

* cited by examiner

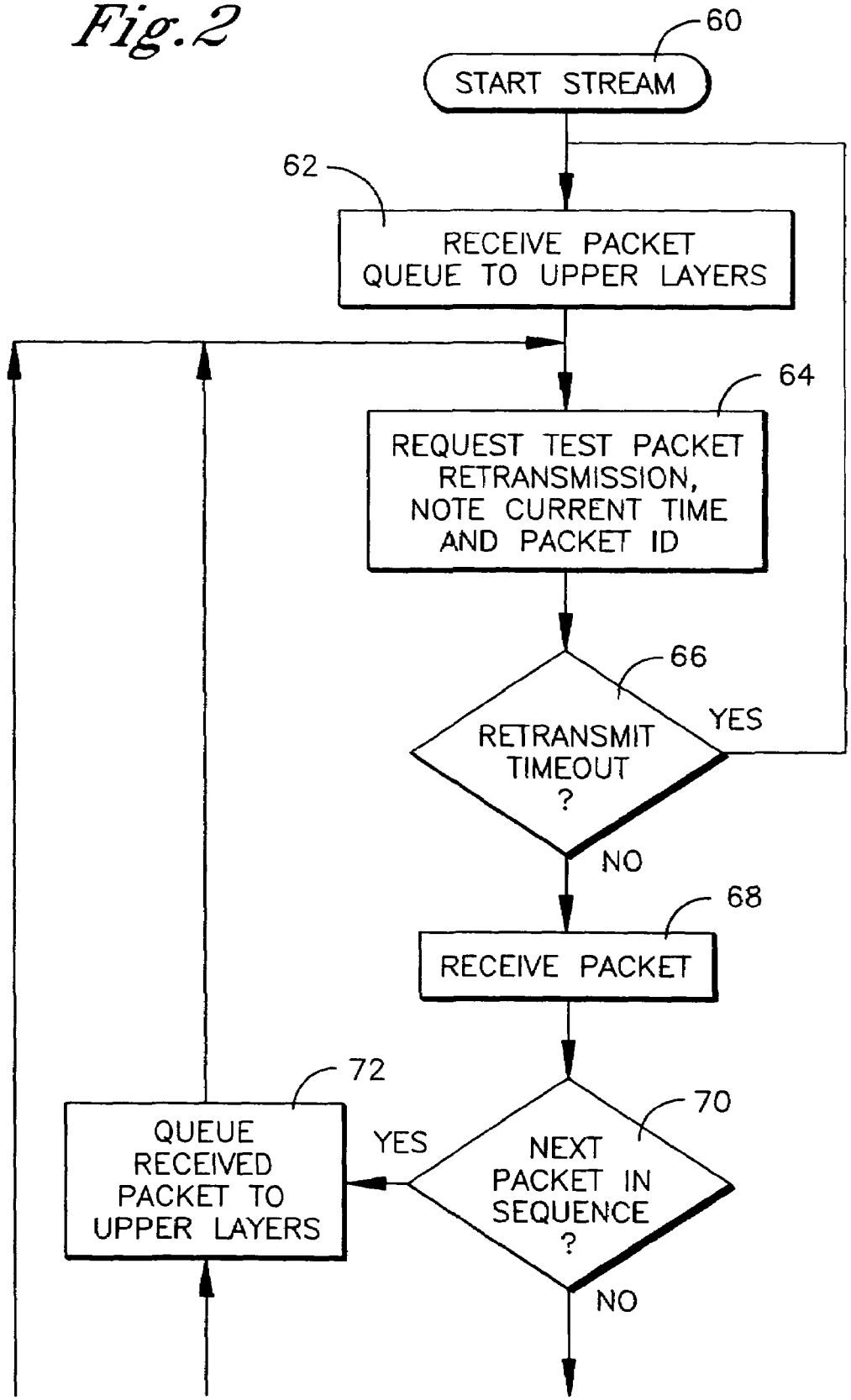

SYSTEM AND METHOD FOR DYNAMICALLY DETERMINING RETRANSMIT BUFFER TIME

FIELD OF THE INVENTION

The present invention relates generally to packetized data communication systems.

BACKGROUND

When transmitting data from a server to a computer system, or from a computer system to another computer system, it is not guaranteed that 100% of the data requested by the user will arrive. Often times some of the data is lost in the transmission or is never sent at all.

Accordingly, methods have been provided for verifying proper receipt of data and when, for instance, a packet in a packetized data stream is not received, for requesting retransmission. In these methods, a data verification layer in a communication protocol stack tracks the received packets and requests retransmission if a packet does not arrive as expected.

As recognized herein, current standards for tracking data often contain overhead and latency which is too high for certain data streaming environments, such as telephony. Nonetheless, a receiver must buffer data before sending it on to higher levels in the protocol stack while waiting for a retransmitted packet. The length of the buffer in current systems is predefined in an attempt to balance the need to wait long enough for a dropped packet to be retransmitted and received, so as to avoid missing the retransmitted packet when the rest of the data is passed on up the protocol stack, but to also avoid waiting longer than necessary. A buffer length that is too long makes the system seem sluggish (i.e. non-responsive) to the user, while a buffer length that is too short allows stuttering of data (such as video frames) that is presented to the user if the retransmission of certain packets is required. The inaccuracies of estimated buffer length and the visible consequences to the user can be frustrating. The present system is presented in response to the above critical observations.

SUMMARY OF THE INVENTION

A method for establishing a packet buffer length in a packetized data delivery system includes, upon initially receiving a packetized data stream, requesting retransmission of a received packet. The method also includes receiving a retransmitted copy of the packet. Based at least in part on the requesting and receiving acts, the buffer length is established.

If desired, an ID of the packet for which retransmission is requested and a time of retransmission request are recorded. Also, a time of receipt of the retransmitted copy is recorded, with the method then using the difference between the time of receipt of the retransmitted copy and the time of retransmission request to establish the buffer length. Preferably, the requesting, receiving, and establishing acts are executed substantially at the beginning of each new packetized data stream being transmitted. The buffer length may be used to delay sending packets to higher communication protocol levels in the event of a missed packet.

In another aspect, a packetized data receiver includes a receiver system that establishes a lower level in a packetized data communication protocol stack. The receiver system requests a retransmission of a received packet at or near the beginning of a packetized data stream being received by the receiver. The logic of the receiver system determines a time period measured from the time of requesting a retransmission until receipt of a retransmitted packet that correlates to the received packet. A buffer delay period is then established based on the time period. The buffer delay period is used in the event of a missing packet to buffer data before sending it to higher levels in the protocol stack.

In yet another aspect, a packetized data receiver establishes, for each packetized data stream received and substantially at the beginning of receiving each respective stream, a time delay to be used in the event that a packet is missed for sending packets to higher levels of a protocol stack.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
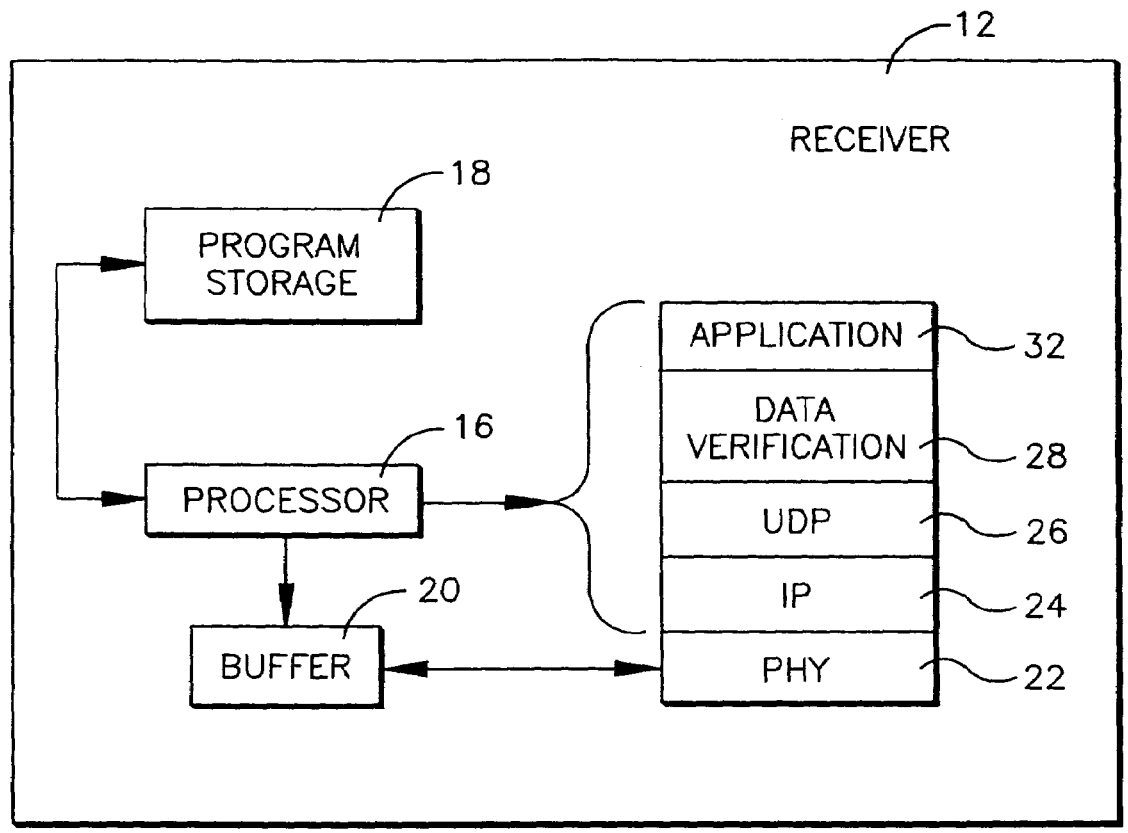
FIG. 1 is block diagram of the present system.
Figure 1:
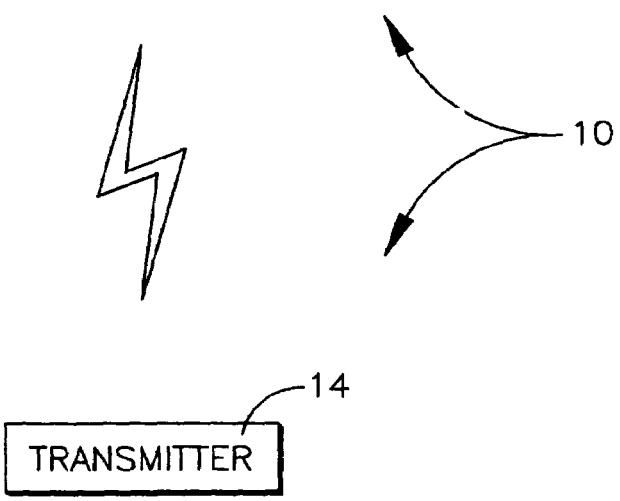

Referring initially to FIG. 1, a system is shown, generally designated 10, which includes receivers 12 and transmitters 14 exchanging information with each other. It is to be understood that FIG. 1 is illustrative only and is non-limiting. For instance, FIG. 1 shows an exemplary non-limiting protocol stack that in practice may include greater or fewer layers than shown. Also, FIG. 1 assumes that the protocol portion used to ensure correct data delivery is user datagram protocol (UDP) and that the data being exchanged is telephony data, but other data delivery correctness protocols may be used such as reliable UDP (R-UDP) and transmission control protocol (TCP) to ensure correct delivery of either or both telephony data and computer data. Thus, without limitation the receiver 12 and transmitter 14 may be nodes in a wired or wireless communication system, and may communicate over a local area network (LAN) in which variations in packet delivery times do not greatly vary, although communication can be over wide area networks (WAN) such as the Internet. In a non-limiting implementation the receiver 12 and transmitter 14 may be mobile telephones or computers or one or both might be a fixed asset such as a wireless communication system base station, fixed computer, or other communication device.

With the above in mind, the exemplary receiver 12 includes a processor 16 that can access a program storage device 18 to execute the logic shown below in FIG. 2. It is to be understood that the program storage device 18 is any suitable electronic storage medium including solid state storage, disk storage, removable storage, etc. It is to be further understood that the logic can be implemented in hardware if desired. Whether implemented in hardware or software, the present logic set forth below can be executed to establish the size of a retransmit buffer 20. By "size" of buffer is meant the length, in data elements, of the buffer, which can be directly correlated to the time data is delayed in the buffer.

FIG. 1 schematically shows that the receiver 12 processes data in a so-called protocol stack that includes several layers of protocols through which data is passed, up to the highest level where the data is used. In the exemplary non-limiting embodiment shown, the protocol stack of the receiver 12 can include a physical layer 22 which receives the transmitted signal from the transmitter 14. Data from the physical layer 22, including voice over internet protocol (VOIP) data, may be packetized into Internet Protocol (IP)-formatted data in an IP layer 24. Data from the IP layer 24 is then passed to a UDP layer 26 and thence to a data verification layer 28 to verify that all packets have been received. In the exemplary embodiment shown, the layer 26 uses UDP, it being understood that it may use other protocols including, without limitation, reliable UDP (R-UDP) and transmission control protocol (TCP). At the top of the protocol stack is an application layer 32, which represents the data in a format that is appropriate for the intended end use, e.g., audible display of a voice or data transformation and processing using an end-use software application.

Figure 2:
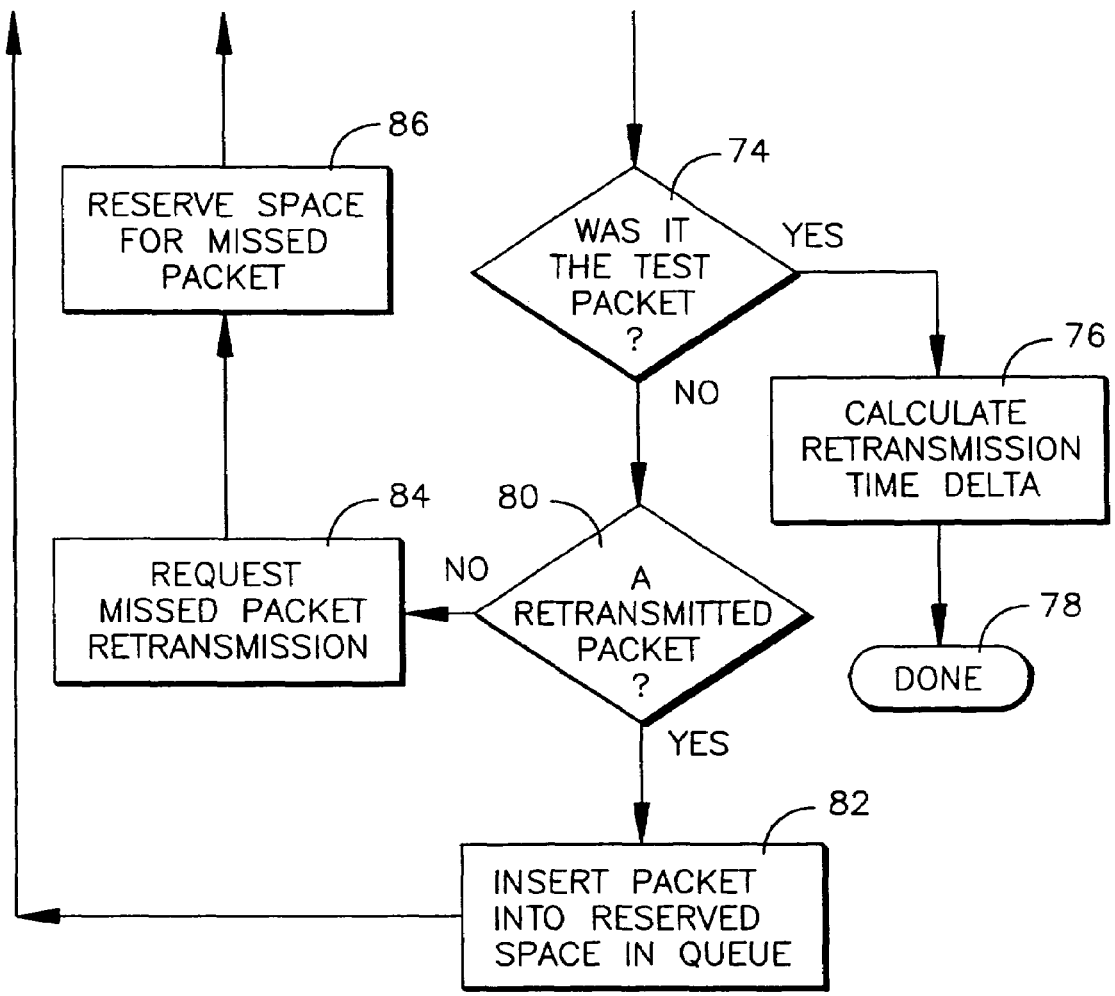
FIG. 2 is a flow chart of the present logic.

Now referring to FIG. 2, a diagram of the logic for establishing a buffer length is shown, with FIG. 2 being executed by the receiver 12 preferably at the start of each packetized stream transmission and, if desired, every time a retransmission is requested for, e.g., missing packets. First, at state 60 the data stream is initiated. Proceeding to block 62, the first packet in the stream is received and queued in, e.g., the buffer 20 shown in FIG. 1 for eventual passing to the upper layers of the protocol stack. After the first (or substantially the first) packet is received, at block 64 retransmission of the first packet, which may be thought of as a test packet, is requested of the transmitter to acquire a real-time measurement of retransmission delay and therefore to be able to dynamically establish the buffer size to accommodate the measured delay, as discussed further below. As indicated at block 64, the current time and packet ID of the test packet are also noted in order to acquire real time data.

Proceeding to decision diamond 66, it is determined whether the retransmit action has failed as indicated by an excessive period elapsing without receiving the retransmitted packet from the transmitter. If it has, the logic reverts back to block 62 and starts over again. If the action has not failed, a packet has been received and the logic proceeds to block 68.

Still referring to FIG. 2, once the packet is received at block 68, at decision diamond 70 it is determined whether the packet fits into the next slot in the total packet sequence (indicating that the packet received at block 68 was not out of sequence and hence was not the test packet). If it is the next packet in the sequence, the logic then moves to block 72 where the packet is placed in the queue (e.g., in the buffer 20 shown in FIG. 1) for eventual passing on to the upper layers of the protocol stack.

Should it be determined at decision diamond 70 that the packet received at block 68 is not the next one in sequence, the logic flows from decision diamond 70 to decision diamond 74, wherein it is determined, by means of comparing the ID of the packet received at block 68 with the packet ID recorded at block 64, whether the packet received was the test packet. If the logic determines that it was the test packet, the logic proceeds to block 76 wherein the time period between the time recorded at block 64 and the time the test packet was received at block 68 is determined. Because this period can be correlated to a buffer length by, e.g., multiplying the data rate by the measured retransmission delay period to find a total number of data elements that must be buffered during the retransmission delay period determined at block 76, the length of the buffer 20 shown in FIG. 1 can be calculated. Once this calculation has been completed, the logic concludes at state 78.

Returning to decision diamond 74, if the packet received at block 68 is not the test packet, the logic proceeds to decision diamond 80, wherein it is determined whether the packet is a retransmitted packet from a slot in the packet stream at which a packet was missed. If it was, the logic then flows to block 82 where the packet is inserted into its correct slot in the queue for subsequent passing on to the upper levels of the protocol stack.

In contrast, if, at decision diamond 80, the logic determines that the packet received is not a retransmitted packet but rather some other packet out of sequence, indicating that some packet or packets have been missed, the logic moves to block 84 where a request for the retransmission is made of the missed packet(s) (i.e., those preceding the packet received at block 68 that should have followed the latest packet before that in the buffer). After the request has been made, a space in the data stream for the missed packet is reserved at block 86, and then the logic moves to block 72 to function as set forth above.

While the particular SYSTEM AND METHOD FOR DYNAMICALLY DETERMINING RETRANSMIT BUFFER TIME as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for establishing a packet buffer length in a packetized data delivery system, comprising:
   upon initially receiving a packetized data stream, requesting retransmission of a received packet;
   receiving a retransmitted copy of the packet; and
   based at least in part on the requesting and receiving acts, establishing the buffer length.

2. The method of claim 1, comprising recording an ID of the packet for which retransmission is requested, and a time of retransmission request.

3. The method of claim 2, comprising recording a time of receipt of the retransmitted copy.

4. The method of claim 3, comprising using a difference between the time of receipt of the retransmitted copy and the time of retransmission request to establish the buffer length.

5. The method of claim 1, comprising executing the requesting, receiving, and establishing acts substantially at the beginning of each new packetized data stream being received.

6. The method of claim 1, wherein the packetized data is in user datagram protocol (UDP).

7. The method of claim 1, comprising using the buffer length to delay sending packets to higher communication protocol levels in the event of a missed packet.

8. A packetized data receiver, comprising:
a receiver system establishing at least in part at least a portion of a lower level in a packetized data communication protocol stack, the receiver system executing logic including:
   requesting a retransmission of a received packet at or near the beginning of a packetized data stream being received by the receiver;
   determining a time period measured from the time of requesting a retransmission until receipt of a retransmitted packet that correlates to the received packet; and
   establishing a buffer delay period based on the time period.

9. The receiver of claim 8, wherein the receiver is a user datagram protocol (UDP) receiver.

10. The receiver of claim 8, wherein the receiver records an ID of the packet for which retransmission is requested, and a time of retransmission request.

11. The receiver of claim 10, wherein the receiver records a time of receipt of the retransmitted copy.

12. The receiver of claim 8, wherein the receiver established the buffer delay period substantially at the beginning of each new packetized data stream being received.

* * * * *

UNITED STATES PATENT AND TRADEMARK OFFICE
CERTIFICATE OF CORRECTION

PATENT NO. : 7,643,503 B2   Page 1 of 1
APPLICATION NO. : 10/903171
DATED : January 5, 2010
INVENTOR(S) : Christopher Jensen Read It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1447 days.

Signed and Sealed this

Sixteenth Day of November, 2010

David J. Kappos
*Director of the United States Patent and Trademark Office*